US008458392B2

(12) United States Patent
Gao et al.

(10) Patent No.: US 8,458,392 B2
(45) Date of Patent: Jun. 4, 2013

(54) UPGRADING A GUEST OPERATING SYSTEM OF AN ACTIVE VIRTUAL MACHINE

(75) Inventors: Zhi Guo Gao, Beijing (CN); Qi Ming Tian, Beijing (CN); Yin Ben Xia, Beijing (CN); Zhe Xiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 12/603,610

(22) Filed: Oct. 22, 2009

(65) Prior Publication Data

US 2010/0106885 A1  Apr. 29, 2010

(30) Foreign Application Priority Data

Oct. 24, 2008 (CN) .......................... 2008 1 0171902

(51) Int. Cl.
*G06F 12/00* (2006.01)
*G06F 12/16* (2006.01)
*G06F 9/44* (2006.01)

(52) U.S. Cl.
USPC 711/6; 711/162; 711/E12.001; 711/E12.103; 717/168; 718/1

(58) Field of Classification Search
USPC ....... 711/6, 162, E12.001, E12.103; 717/168; 718/1
See application file for complete search history.

(56) References Cited

U.S. PATENT DOCUMENTS

| 7,330,942 | B2* | 2/2008 | de Dinechin et al. ......... 711/152 |
| 2004/0064813 | A1* | 4/2004 | Neiger et al. ...................... 718/1 |
| 2005/0268298 | A1* | 12/2005 | Hunt et al. ........................ 718/1 |
| 2006/0026383 | A1* | 2/2006 | Dinechin et al. .............. 711/207 |
| 2006/0206892 | A1* | 9/2006 | Vega et al. ........................ 718/1 |
| 2008/0104588 | A1 | 5/2008 | Barber et al. |
| 2008/0133208 | A1 | 6/2008 | Stringham |
| 2008/0244577 | A1* | 10/2008 | Le et al. ............................ 718/1 |
| 2009/0037649 | A1* | 2/2009 | Xu ................................ 711/103 |
| 2009/0216975 | A1* | 8/2009 | Halperin et al. ............. 711/162 |
| 2009/0292737 | A1* | 11/2009 | Hayton ........................ 707/200 |
| 2010/0049929 | A1* | 2/2010 | Nagarkar et al. ............. 711/162 |

\* cited by examiner

*Primary Examiner* — Mardochee Chery
(74) *Attorney, Agent, or Firm* — Derek S. Jennings; Gail Zarick

(57) ABSTRACT

A method and device for upgrading a guest operating system (OS) of an active Virtual Machine (VM). The method includes: replicating the active VM to generate a backup VM; upgrading a guest OS of the backup VM; merging changes to be made to a virtual disk image file during running of the active VM and changes to be made to the virtual disk image file during the upgrading; pausing the backup VM; migrating an active process of a Java application program running in the active VM into the backup VM to generate a backup process; migrating resources occupied by the active process of the Java application program into the backup VM such that the backup process occupies the same resources; and resuming running of the backup VM. The device includes: a replicating unit; an upgrading unit; a merging unit; a migrating unit; and a control unit.

20 Claims, 3 Drawing Sheets

UPGRADING A GUEST OPERATING SYSTEM OF AN ACTIVE VIRTUAL MACHINE

CROSS-REFERENCE TO RELATED APPLICATIONS

This application claims priority under 35 U.S.C. §119 to Chinese Patent Application No. 200810171902.6 filed Oct. 24, 2008, the entire contents of which are incorporated by reference herein.

BACKGROUND OF THE INVENTION

1. Field of the Invention

The present invention relates to a method and a device for upgrading a guest Operating System (OS) of an active Virtual Machine (VM).

2. Description of the Related Art

Availability is a key factor for evaluating system performance. The availability means a degree to which a system, a sub-system, or a device providing services is operable and in a committable state at the beginning of a task, when the task is called at an unknown or random time. Briefly speaking, the availability can be represented by a proportion of time in which a system is in a functioning condition. In order to achieve high-availability (HA), a number of techniques have been developed in many aspects, such as hardware-level HA devices, software-level HA middleware, clusters, HA-oriented application programming model, and so on.

Currently, a technical trend of IT systems is service-oriented architecture (SOA), a basic concept of which is to set up many isolated, reusable, and independent services which can be integrated easily. Virtualization becomes a good platform to host a number of such independent services; in particular, multiple VMs that are independent of each other are set up on a physical machine, and each of the small services runs in the respective VMs. Thus, the virtualization is capable of incorporating a number of independent VMs providing various services into a physical server, such that the customer's cost for owning such a system capable of providing the various services is reduced, the whole system is easy to be managed, and resources of the physical server can be utilized more efficiently. Therefore, the need for over-provisioning resources for a single workload spike is removed.

However, one problem with a conventional IT system using a VM is how to update a platform supporting a provided service, for example, an OS of the VM in which the service resides (i.e. a guest OS), while keeping the availability of the service. Generally, after a patch for upgrading the guest OS is installed into the guest OS of the running VM (i.e., the active VM), the VM often needs to be rebooted, which renders the service provided by the VM unavailable during the rebooting.

In consideration of the above problems, the present invention provides a method and a device capable of upgrading a guest OS of an active VM while keeping availability of a service.

SUMMARY OF THE INVENTION

One aspect of the present invention provides a method for upgrading a guest OS of an active VM, including: replicating the active VM to generate a backup VM, the backup VM using a virtual disk image file of the active VM set to be read-only as the virtual disk image file thereof; upgrading a guest OS of the backup VM; merging changes to be made to the virtual disk image file during running of the active VM and changes to be made to the virtual disk image file during the upgrading into the virtual disk image file; pausing the backup VM; migrating an active process of a Java application program running in the active VM into the backup VM to generate a backup process; migrating resources occupied by the active process of the Java application program into the backup VM such that the backup process occupies the same resources; and resuming running of the backup VM.

Another aspect of the present invention provides a device for upgrading a guest OS of an active VM, including: a replicating unit for replicating the active VM to generate a backup VM, the backup VM using a virtual disk image file of the active VM set to be read-only as the virtual disk image file thereof; an upgrading unit for upgrading a guest OS of the backup VM; a merging unit for merging changes to be made to the virtual disk image file during running of the active VM and changes to be made to the virtual disk image file during the upgrading into the virtual disk image file; a migrating unit for (i) migrating an active process of a Java application program running in the active VM into the backup VM to generate a backup process and (ii) migrating resources occupied by the active process of the Java application program into the backup VM such that the backup process occupies the same resources; and a control unit for (i) pausing the backup VM before the migrating unit migrates the active process and the resources and (ii) resuming the running the backup VM after the migrating unit migrates the active process and the resources.

The method and device for upgrading a guest OS of an active VM according to the above aspects of the present invention can upgrade the guest OS of the active VM without interrupting the service provided by the active VM, thereby improving the availability of the whole system.

DETAILED DESCRIPTION OF PREFERRED EMBODIMENTS

Figure 1:
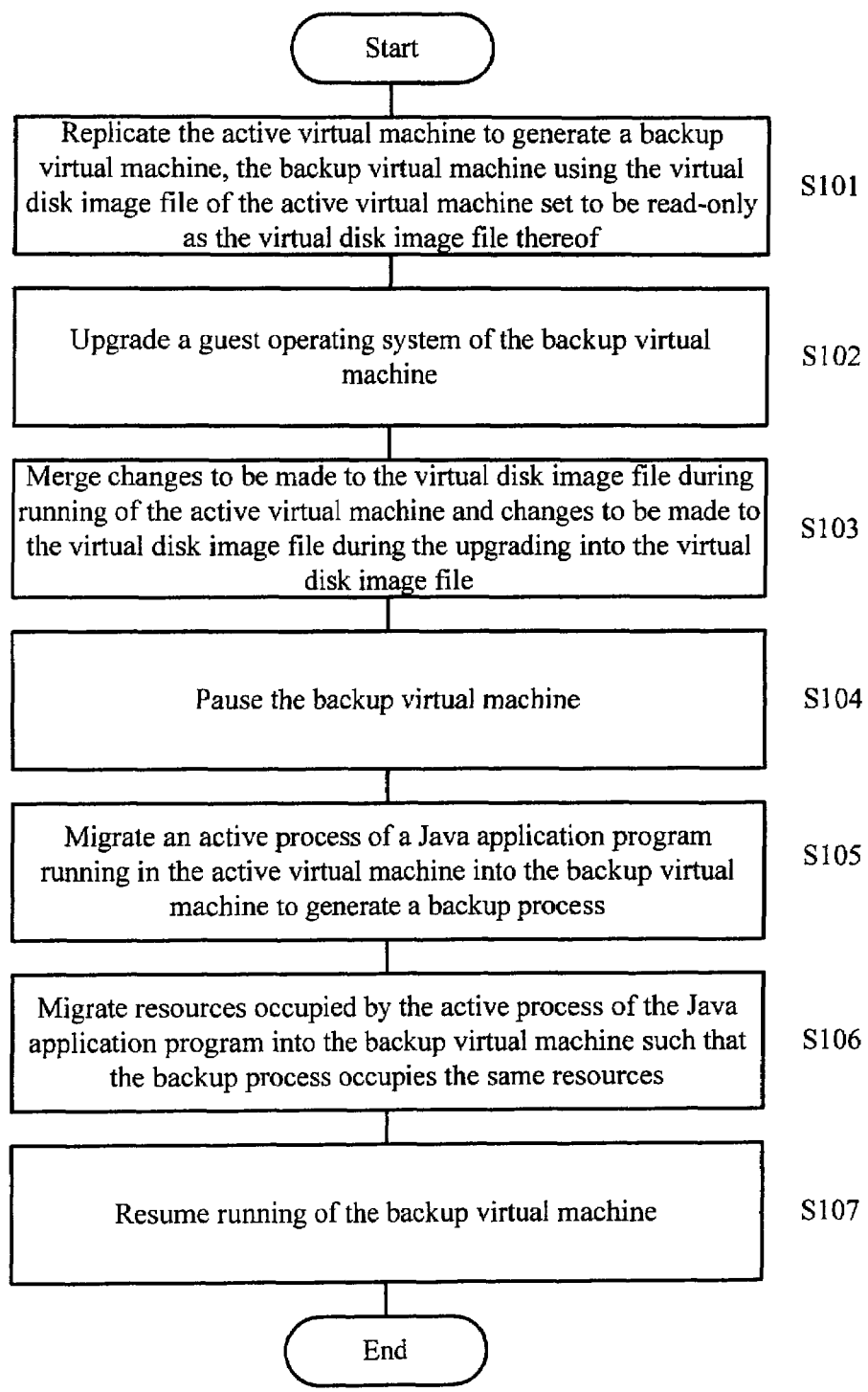
FIG. 1 is a flow diagram showing a method for upgrading a guest OS of an active VM according to an embodiment of the present invention.

The present invention provides a method and a device for upgrading a guest OS of an active VM that are capable of completing the upgrading of the guest OS of the VM while keeping availability of a service provided by the active VM, thereby improving the availability of the whole system.

As is well known, one or more VMs are formed on a physical machine by installing VM software, for example, VMware, in an OS of the physical machine (called a host OS or a host OS) and configuring with the VM software. An OS, called a guest OS (Guest OS), such as Windows®, Linux, and so on, can be installed in the respective VMs as required, and various application programs, for example, Java application programs, may be run on the guest OS to provide respective services. From the angle of the physical machine, the VMs correspond to virtual disk image files and related configuration files stored in disk of the physical machine. In runtime, from the angle of physical machine, VM correspond to a process of host OS.

In the VM on the physical machine, a Java VM must be installed in the guest OS of the VM in order to enabling Java application programs to run independently of the guest OS of the VM. A process of each of the Java application programs runs in the Java VM and occupies memory space and resources, such as ports, managed by the Java VM. The memory space and the resources are further associated with memory space and resources managed by the guest OS of the VM in which the Java VM resides.

Because the VM only simulates a real machine on the basis of the physical machine, the memory space and the resources will eventually be directed to a memory space and resources on the physical machine. Some examples include: for a virtual memory address used by an active process of a Java application program, a mapping table indicating a mapping relationship for mapping the virtual memory address to a memory address managed by the guest OS of the VM is saved in a Java VM in which the active process resides (an uppermost layer); for the memory address managed by the guest OS of the VM, a mapping table indicating a mapping relationship for mapping the memory address to a memory address managed by the VM is saved in the guest OS of the VM; for the memory address managed by the VM, a mapping table indicating a mapping relationship for mapping the memory address to a memory address managed by the host OS of the physical machine is saved in the VM; for the memory address managed by the host OS of the physical machine, a mapping table indicating a mapping relationship for mapping the memory address to a physical memory address of the physical machine is saved in the host OS of the physical machine (a lowermost layer).

For various resources used by the active process, similar mapping tables indicating mapping relationships of the resources among the above respective layers exist in such respective layers. Besides the mapping tables, other data structures can be used to indicate the mapping relationships. By means of these mapping relationships, the virtual memory space and the various virtual resources used by the active process of the Java application program in the Java VM can be mapped into the physical memory space and various physical resources of the physical machine from layer to layer.

For example, in order to compensate for security bugs of a guest OS or add new functions to the guest OS, the guest OS is often needed to be upgraded in a manner of patch installation. As described above, conventionally, after the guest OS is upgraded, a VM in which the guest OS resides is needed to be rebooted, such that a service provided by the VM is interrupted and availability of the system is deteriorated. To this end, the present invention proposes a method and a device for upgrading a guest OS of an active VM, which replicate the original active VM to generate a backup VM with a same setting, upgrade a guest OS on the backup VM, and then migrate application program processes running on the original VM to the backup VM, so as to achieve the upgrading of the guest OS without interrupting a service.

FIG. 1 shows a flow diagram of the method for upgrading a guest OS of an active VM according to an embodiment of the present invention.

As described above, one or more application programs run in guest OSs of one or more active VMs on a physical machine to provide respective services. It is assumed that one of the active guest OSs is upgraded here for the convenience of illustration. The present invention is also applicable to the case in which guest OSs of a plurality of VMs are upgraded.

As shown in FIG. 1, in step S101, the active VM is replicated to generate a backup VM. The backup VM uses a virtual disk image file of the active VM set to be read-only as the virtual disk image file thereof. Specifically, the virtual disk image file of the active VM which is running is set to be read-only before the replication. Then, the backup VM having the same setting as the active VM is created by means of, for example, VM software, and the backup VM is set so that it uses the virtual disk image file of the active VM which has been set to be read-only as the virtual disk image file thereof. In the embodiment of the present invention, the active VM and the backup VM reside on a same physical machine.

When the virtual disk image file of the active VM is set to be read-only, the guest OS of the active VM and a process of an application program running under the guest OS are still running, i.e., in an active state. As a result, it may be necessary to perform a write operation on the virtual disk image file of the VM. At this time, if such a write operation is to be performed, it is directed to another incremental disk file (hereinafter referred to as a first incremental disk file). In particular, contents that the guest OS and the active process of the application program need to write into the virtual disk image file are written into the first incremental disk file such that changes to be made to the virtual disk image file during running of the active VM are stored in the first incremental disk file.

After the backup VM is generated, in step S102, a guest OS of the backup VM is upgraded. For example, the guest OS may be upgraded by booting the backup VM, and installing a patch for the guest OS into the guest OS. In one embodiment of the present invention, the method for upgrading the guest OS by installing the patch uses a conventional method except that because the backup VM uses a read-only version of the virtual disk image file of the original active VM as the virtual disk image file thereof, a write operation to be performed on this virtual disk image file used by the backup VM during the upgrading is directed to another incremental file (hereinafter referred to as a second incremental disk file). In particular, contents to be written into the virtual disk image file of the backup VM during the upgrading are written into the second incremental disk file such that changes to be made to the virtual disk image file during the upgrading are stored in the second incremental disk file.

Subsequently, in step S103, the changes to be made to the virtual disk image file during running of the active VM and the changes to be made to the virtual disk image file during the upgrading are merged into the virtual disk image file. Preferably, before the merging step is performed, the active VM and the active process of the application program running therein are paused first to avoid generating new write operations during the merge, and the virtual disk image file set to be read-only, which was previously is set to be writable. Then, the contents stored in the first incremental disk file and in the second incremental disk file are merged into the virtual disk image file. The method for merging the files is well known in the art, thus a detailed description thereof are omitted for the sake of simplicity. It is to be noted that, since the contents stored in the first incremental disk file and in the second incremental disk file may include a change to a same part of the virtual disk image file, a conflict may occur between the first incremental disk file and the second incremental disk file. In practice, the probability of such a conflict is very low. However, if such a conflict does occur, the priority of the second incremental disk file can be set higher than that of the first incremental disk file. In other words, the virtual disk image file can be modified based on the second incremental disk file.

Next, in step S104, the backup VM is paused.

Because the active process of the Java application program running in the original active VM is providing a service, it is necessary to start a same backup process in the backup VM and then switch the service provider seamlessly from the original active process to the backup process in order to complete the upgrading without interrupting the service. To this end, in step S105, the active process of the Java application program running in the active VM is migrated into the backup VM to generate the backup process. For example, a new process (i.e., a backup process) of the Java application program can be created in the backup VM, and a memory space which is the same as that occupied by the active process in the original active VM is associated with the new process, such that the new process possesses the same memory space as the original active process.

Because the original active process of the Java application program occupies system resources, for example, ports, when running in the active VM, it is necessary to make the backup process occupy the same resources in the backup VM in order to enable the generated backup process to provide the same service. Accordingly, in step S106, the resources occupied by the active process of the Java application program are migrated into the backup VM such that the backup process occupies the same resources.

The backup process of the Java application program in the backup VM can provide the same service as that provided by the original active process because it occupies the same memory space and resources as those occupied by the original active process.

Figure 2:
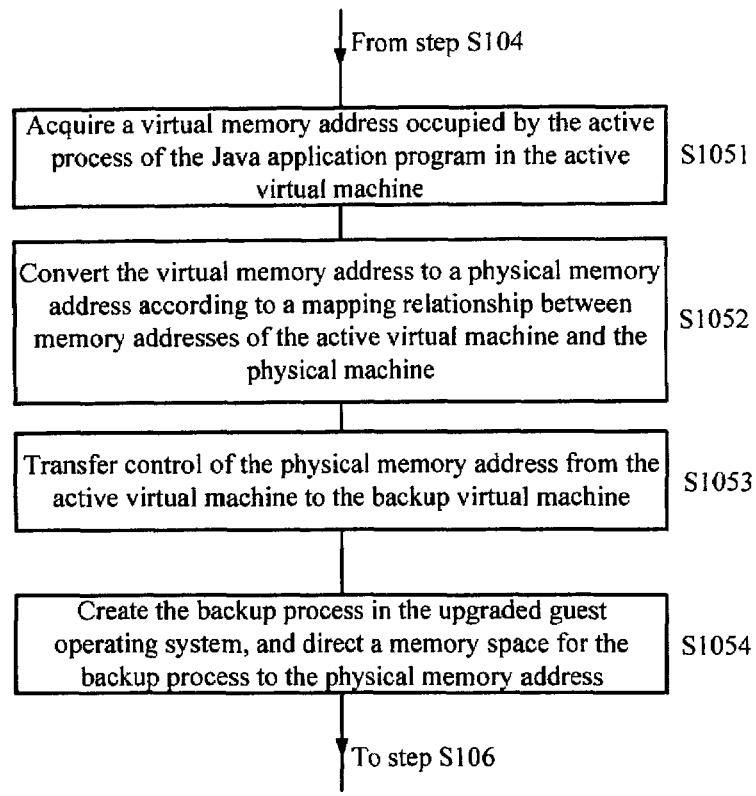
FIG. 2 is a flow diagram showing a migration operation of an active process of a Java application program in step S105 shown in FIG. 1.

FIG. 2 is a flow diagram showing a migration operation of an active process of a Java application program in step S105 shown in FIG. 1. After the backup VM is paused, in step S1051, a virtual memory address occupied by the active process of the Java application program in the original active VM is acquired. The virtual memory address represents the memory space occupied by the active process in the original active VM.

Next, in step S1052, the acquired virtual memory address is converted into a physical memory address occupied by the active process in the physical machine according to a mapping relationship between virtual memory addresses managed by the active VM and physical memory addresses in the physical machine in which the active VM resides. The physical memory address represents a memory space actually occupied by the active process in the physical machine. As described above, mapping tables include mapping relationships between memory addresses managed in a present layer and memory addresses managed in a lower layer are saved in respective layers including the Java VM in which the active process of the Java application program resides, the guest OS of the active VM in which the Java VM resides, the active VM, and the host OS of the physical machine in which the active VM resides, and a mapping relationship between the virtual memory addresses managed by the active VM and the physical memory addresses in the physical machine in which the VM resides can be obtained based on these mapping relationships, thereby achieving the conversion.

Subsequently, in step S1053, control of the physical memory address is transferred from the original active VM to the backup VM. For example, this transfer can be achieved by establishing a mapping table in the backup VM, where the mapping table indicates a mapping relationship for mapping a memory address, which is identical to the memory address for the active process managed by the original VM, to the physical memory address.

Next, in step S1054, in the upgraded guest OS of the backup VM, the backup process of the Java application program is created, and a memory space for the backup process is directed to the physical memory address. For example, the mapping tables indicating the mapping relationships among the memory addresses managed in the respective layers can be established in the Java VM in which the backup process resides, the guest OS of the VM in which the Java VM resides, the VM in which the Java VM resides, and the host OS of the physical machine in which the VM resides in an order from a lower layer to an upper layer, and by means of these mapping tables, the memory space used by the backup process in the Java VM is sequentially associated to corresponding memory addresses managed in the respective layers, and is finally associated to the memory space represented by the physical memory address. In this way, the migration of the active process of the Java application program in the original active VM to the backup VM is achieved. Here, since the original VM and the backup VM are located in the same physical machine herein, the process of the Java application program can be migrated by creating the mapping tables indicating the mapping relationships among the memory addresses managed in the respective layers. As a result, a time-consuming replication operation is avoided.

Figure 3:
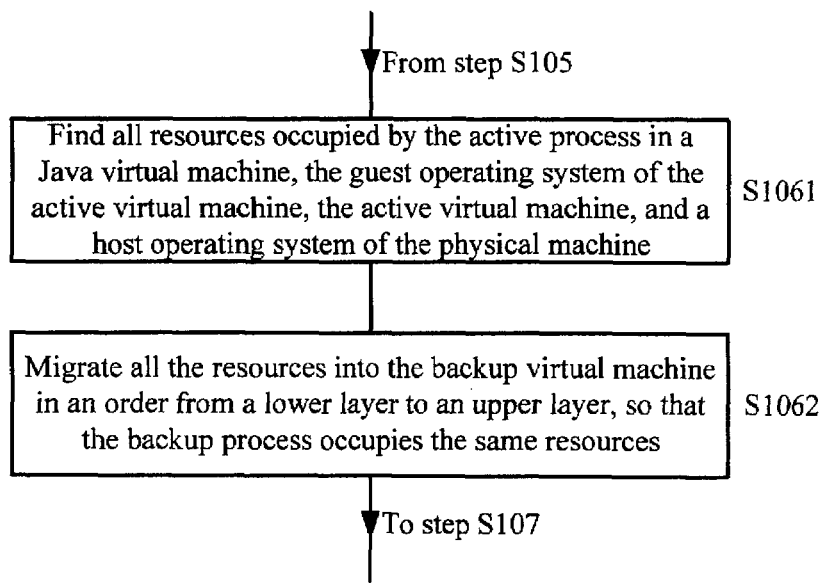
FIG. 3 is a flow diagram showing an migration operation of resources occupied by the active process of the Java application program in step S106 shown in FIG. 1.

FIG. 3 is a flow diagram showing an operation of migrating the resources occupied by the active process of the Java application program in step S106 shown in FIG. 1.

As described above, the resources occupied by the original active process of the Java application program in the Java VM are eventually directed to the real physical resources in the physical machine. In other words, the resources occupied by the active process in the Java VM are mapped by the Java VM to the resources managed by the guest OS of the VM in which the Java VM resides, the resources managed by the guest OS are mapped by the guest OS to the resources managed by the VM, and the resources managed by the VM are mapped by the VM to the physical resources managed by the host OS of the physical machine. In order to enable the migrated application program to work normally and to uninterruptedly provide a service which is the same as that provided by the original active process, it is necessary to migrate the resources occupied by the original active process accurately into the upgraded guest OS such that the backup process also occupies the same resources.

Referring to FIG. 3, in step S1061, all resources occupied by the original active process of the Java application program respectively in the corresponding Java VM, the guest OS of the active VM, the active VM, and the physical machine are found. For example, various resources R1 occupied by the active process in the Java VM can be first found, then resources R2 managed by the guest OS to which each of the resources R1 corresponds, resources R3 managed by the VM to which each of the resources R2 corresponds, and resources R4 managed by the host OS of the physical machine to which each of the resources R3 corresponds are found sequentially in accordance with the respective mapping relationships saved in the respective layers including the guest OS of the VM in which the Java VM resides, the VM in which the Java VM resides, and the host OS of the physical machine in which the VM resides.

Next, in step S1062, all of the found resources are migrated into the backup VM in an order from a lower layer to an upper layer, such that the backup process in the backup VM occupies the same resources as the original active process. For example, after resources R1 to R4 are found, these resources can be migrated into the backup VM in the following way: first, a resource pointer is created in the backup VM with reference to resources R3 which are associated with resources R4 and managed by the original active VM, the pointer associating resources R3' which are the same as resources R3 and managed by the backup VM to resources R4; then, a resource pointer is established in the upgraded guest OS of the backup VM with reference to resources R2 which are associated with resources R3 and managed by the guest OS of the original active VM, the pointer associating resources R2' which are the same as resources R2 and managed by the guest OS of the backup VM to resources R3'; next, a resource pointer associating resources R1' which are the same as resources R1 and managed by the Java VM in which the backup process resides to the resources R2' is established in the Java VM with reference to resources R1 which are associated with resources R2 and managed by the Java VM in which the original active process resides; finally, resources R1' are associated to the backup process. Thus, the backup process in the backup VM occupies resources R1', R2', R3', and R4 which are the same as those occupied by the original active process. The resource pointers herein may be the mapping tables indicating the mapping relationships as described above or other data structures.

Because the Java application program running in the original active VM may correspond to one or more active processes, steps S105 and S106 are repeated for each of the active processes of the Java application program. Thus, running environments that are the same as those for all of the active processes in the original active VM are established in the backup VM for all of the active processes.

Returning to FIG. 1, after the above-described migration is completed, in step S106, running of the backup VM which has been paused previously is resumed. Therefore, the process established in the backup machine performs subsequent operations based on the migrated resources such that the provider of the service is switched from the original active process to the backup process, thereby providing the service without interruption.

The guest OS of the VM can be updated without interrupting the service by upgrading the guest OS of the backup VM which is acquired by replicating the original VM, migrating the application program running in the original active VM and the resources thereof into the backup VM, and then replacing the original active VM with the backup VM.

Figure 4:
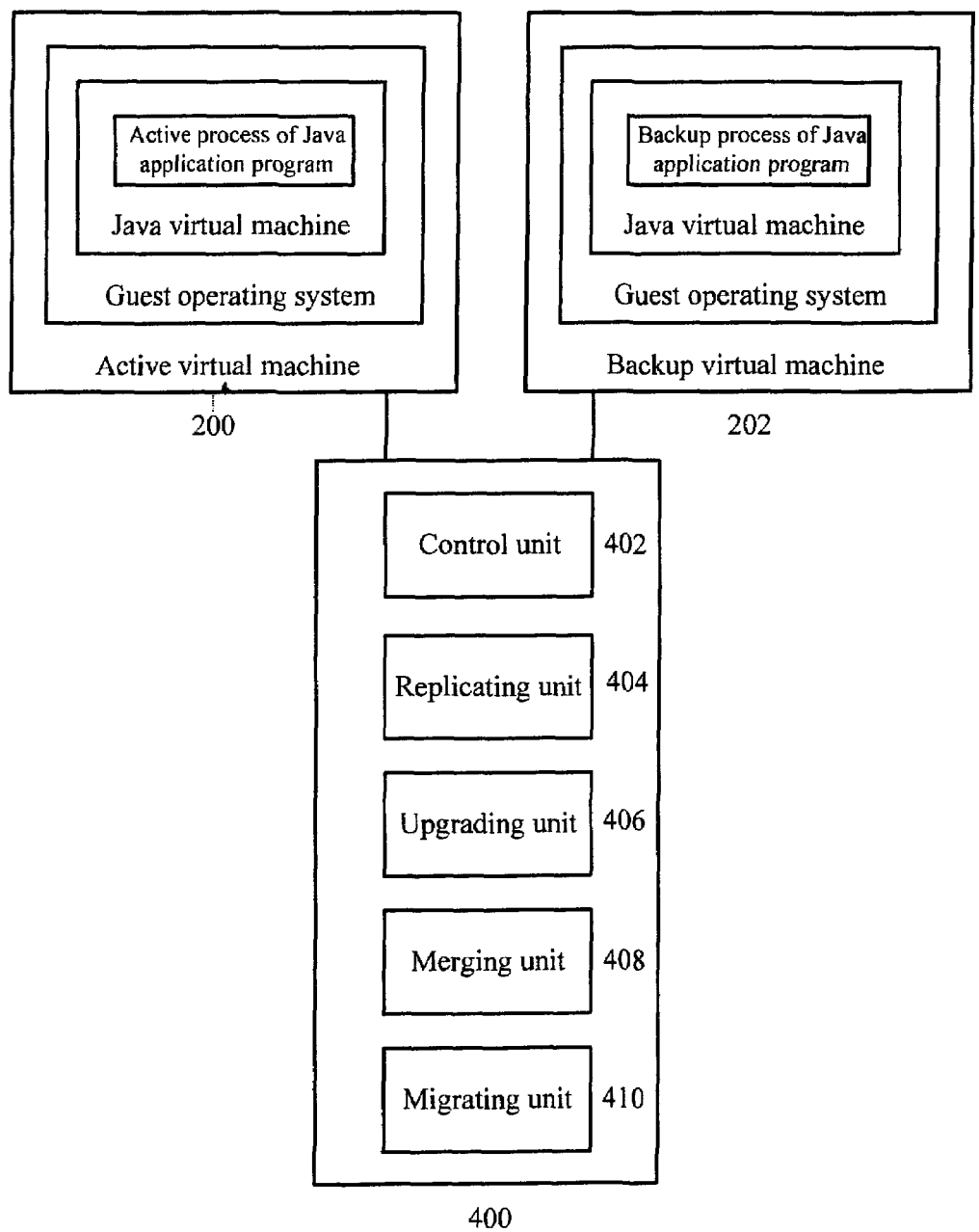
FIG. 4 is a block diagram showing a device for upgrading a guest OS of an active VM according to an embodiment of the present invention.

FIG. 4 is a block diagram showing a device for upgrading a guest OS of an active VM according to an embodiment of the present invention. As shown in FIG. 4, the device 400 for upgrading a guest OS of an active VM 200 according to the embodiment includes a control unit 402, a replicating unit 404, an upgrading unit 406, a merging unit 408, and a migrating unit 410.

For an active VM 200 whose guest OS is to be upgraded, the replicating unit 404 replicates the active VM 200 to generate a backup VM 202 which uses a virtual disk image file of the active VM 200 set to be read-only as the virtual disk image file thereof. The upgrading unit 406 is used to upgrade a guest OS of the backup VM 202. The merging unit 408 merges the changes to be made to the virtual disk image file during running of the active VM 200 and the changes to be made to the virtual disk image file during the upgrading into the virtual disk image file. The migrating unit 410 migrates an active process of a Java application program running in the active VM 200 into the backup VM 202 to generate a backup process, and migrates resources occupied by the active process of the Java application program into the backup VM 202 such that the backup process occupies the same resources. The control unit 402 pauses the backup VM 202 before the migrating unit 410 migrates the active process and the resources, and resumes running of the backup VM 202 after the migrating unit 410 migrates the active process and the resources. The control unit 402 may also perform other control during the entire upgrading.

Hereinafter, functions of the respective units will be described in conjunction with a procedure of upgrading the guest OS of the active VM 200 by using the device 400.

The replicating unit 404 replicates the active VM 200 which is providing a service to generate the backup VM 202 which uses the virtual disk image file of the active VM 200 set to be read-only as the virtual disk image file thereof. Specifically, the control unit 402 sets the virtual disk image file of the active VM 200 which is running to be read-only before the replication. The replicating unit 404 creates the backup VM 202 having a same setting as the active VM 200 by means of VM software, such as VMware, and sets the backup VM 202 so that it uses the virtual disk image file of the active VM 200 set to be read-only as the virtual disk image file thereof. As described above, the active VM 200 and the backup VM 202 are located on the same physical machine.

Since the virtual disk image file of the active VM 200 is set to be read-only, and the guest OS of the active VM 200 and the process of the application program running under the guest OS are still in an active state and may need to perform a write operation, the control unit 402 directs the write operation needed to be performed on the virtual disk image file of the active VM 200 during running of the active VM 200 to a first incremental disk file, such that contents that need to be written into the virtual disk image file, i.e., changes to be made to the virtual disk image file during the running of the active VM 200, are written into the first incremental disk file.

The upgrading unit 406 upgrades the guest OS of the generated backup VM 202. For example, the upgrading unit 406 can boot the backup VM 202, and upgrade the guest OS of the backup VM 202 by installing a patch for the guest OS into the guest OS. The method for the upgrading unit 406 to upgrade the guest OS uses a conventional method except that because the backup VM 202 uses a read-only version of the virtual disk image file of the original active VM 200 as the virtual disk image file thereof, the control unit 402 controls to direct a write operation that needs to be performed on this virtual disk image file during the upgrade to a second incremental disk file, such that changes to be made to the virtual disk image file during the upgrading are stored in the second incremental disk file.

The merging unit 408 merges the changes to be made to the virtual disk image file during the running of the active VM 200 and the changes to be made to the virtual disk image file during the upgrade into the virtual disk image file. Before performing the merge, the control unit 402 pauses the active VM 200 and the active process of the application program running therein, and sets the virtual disk image file to be read-only, which was previously set to be writable. The merging unit 408 merges the contents stored in the first incremental disk file and in the second incremental disk file into the virtual disk image file by using a method commonly known in the art. If the contents stored in the first incremental disk file and in the second incremental disk file include a change to be made to the same part of the virtual disk image file so that a conflict occurs, the merging unit 408 may modify the virtual disk image file based on the second incremental disk file. The probability for such conflict to occur is very low in practice.

After the files are merged, the control unit 402 pauses the generated backup VM 202.

The migrating unit 410 migrates the active process of the Java application program running in the original active VM 200 into the backup VM 202 so as to generate the backup process in the backup VM 202. Specifically, the migrating unit 410 acquires a virtual memory address, i.e., a memory space, occupied by the active process of the Java application program in the active VM 200. Then, the migrating unit 410 converts the acquired virtual memory address to a physical memory address occupied by the active process in a physical machine according to a mapping relationship between virtual memory addresses in the active VM 200 and physical memory addresses in the physical machine in which the VM resides. The physical memory address represents a memory space actually occupied by the active process in the physical machine.

As described above, the migrating unit 410 can acquire the mapping relationship between the virtual memory addresses in the active VM 200 and the physical memory addresses in the physical machine in which the VM 200 resides by using mapping tables indicating mapping relationships between memory addresses managed in a present layer and memory addresses managed in a lower layer, which are saved respectively in the Java VM in which the active process of the Java application program resides, the guest OS of the VM 200 in which the Java VM resides, the VM 200, and a host OS of the physical machine in which the VM 200 resides. The mapping relationships may be represented by other data structures, besides the mapping tables.

The migrating unit 410 transfers control of the physical memory address from the original active VM 200 to the backup VM 202. For example, the migrating unit 410 may achieve this transfer by establishing a mapping table in the backup VM 202, where the mapping table indicates a mapping relationship for mapping a memory address which is the same as the memory address for the active process and managed by the original VM 200 to the physical memory address.

The migrating unit 410 also creates the backup process of the Java application program in the upgraded guest OS of the backup VM 202, and directs a memory space for the backup process to the physical memory address. For example, the migrating unit 410 can establish the mapping tables indicating the mapping relationships among the memory addresses managed in the respective layers in the Java VM in which the backup process resides, the guest OS of the VM 202 in which the Java VM resides, the VM 202, and the host OS of the physical machine in which the VM 202 resides in an order from a lower layer to an upper layer, and sequentially associate the memory space used by the backup process in the Java VM to corresponding memory addresses managed in the respective layers and finally to the memory space represented by the physical memory address. In this way, the migrating unit 410 migrates the original active process into the backup VM.

The migrating unit 410 also migrates the resources occupied by the active process of the Java application program in the active VM 200 into the backup VM 202, such that the backup process in the backup VM occupies the same resources as those occupied by the original active process. For example, the migrating unit 410 can find all resources occupied by the original active process of the Java application program respectively in the corresponding Java VM, the guest OS of the active VM 200, the active VM 200, and the physical machine, and migrates all of the found resources into the backup VM 202 step by step in an order from a lower layer to an upper layer, such that the backup process created in the backup VM 202 occupies the same resources as those occupied by the original active process.

The migrating unit 410 can achieve the above migration in accordance with a method similar to that shown in FIG. 3. Thus, a detailed description of the migration procedure is omitted here for the sake of simplicity.

The migrating unit 410 repeats the above-described operations for each active process of the Java application program running in the original active VM 200 until running environments which are the same as those for all of the active processes in the original active VM 200 are established in the backup VM 202 for all the active processes. Then, the control unit 402 resumes the running of the backup VM 202 which was previously paused, such that the backup process in the backup VM 202 begins to provide the service, that is, the provider of the service is switched from the original active process to the backup process, thereby accomplishing the upgrading of the guest OS without interrupting the service.

The respective units 402 to 410 of the device 400 can be implemented by hardware, software, firmware, or a combination thereof. In addition, the respective units can be further combined into one or more modules or divided into more modules, as long as these modules can achieve the above-described functions of the device 400 in combination.

The present invention is not limited to the above-mentioned specific migration manner and migration order used in describing the migration of the active process of the Java application program and the migration of the resources occupied by the active process. Those skilled in the art can appreciate that other migration manners and migration orders can be adopted to migrate the active process and the resources occupied by the active process, as long as these manners and orders can eventually render those active processes that are the same as the those in the original active VM 200 existing in the guest OS of the backup VM, where such active processes have the same states as those of the active processes in the original active VM 200.

In the method and the device for upgrading a guest OS of an active VM 200 according to the embodiments of the present invention, the upgrading of the guest OS is performed on the backup VM 202 which is a copy of the original active VM 200, the backup process which is the same as the active process of the application program running on the original active VM 200 is created on the backup VM 202, and then the original active process is replaced with this process in the backup VM 202 to provide the service, such that the guest OS of the VM can be upgraded without interrupting the service provided by the original active process, thereby improving availability during the system maintenance.

Alternative embodiments of the present invention may further include computer readable codes on a computer readable medium. The computer readable codes can, when executed, perform the above-described method for upgrading a guest OS of an active VM 200. The computer readable medium may include a computer readable recording medium and a computer readable transmission medium. The computer readable recording medium is any data storage apparatus that can store data which can be read by a computer system subsequently.

Examples of the computer readable recording medium include a magnetic storage medium, such as a read-only memory (ROM), a random access memory (RAM), a CD-ROM, a magnetic tape, a floppy disk, and a hard disk, and an optical storage apparatus, such as a CD (compact disk) and a DVD (digital versatile disk). The computer readable recording medium may also be distributed on network-coupled computer systems so that the computer readable codes are stored and executed in a distributed way. The computer readable transmission medium can transmit a carrier or a signal (for example, a wired or wireless data transmission via the Internet). In addition, programmers in the art can easily construe a functional program, a code and a code segment for implementing the present invention.

Although the exemplary embodiments of the present invention have been described above, it is to be understood by those skilled in the art that various changes in form and details can be made to these exemplary embodiments without departing from the scope and spirit of the present invention as defined in the claims and equivalents thereof.

What is claimed is:

1. A method for upgrading a guest Operation System (OS) of an active Virtual Machine (VM), comprising:
   replicating said active VM to generate a backup VM, said backup VM using a virtual disk image file of said active VM, wherein said virtual disk image file is set to be read-only;
   upgrading a guest OS of said backup VM into said virtual disk image file;
   merging changes to be made to said virtual disk image file during running of said active VM and changes to be made to said virtual disk image file during said upgrading;
   pausing said backup VM;
   migrating an active process of a Java application program running in said active VM into said backup VM to generate a backup process;
   migrating resources occupied by said active process of said Java application program into said backup VM such that said backup process occupies same resources; and
   resuming running of said backup VM.

2. The method according to claim 1, wherein said virtual disk image file is set to be read-only before said active VM is replicated, and wherein said backup VM has the same setting as said active VM.

3. The method according to claim 2, wherein a write operation to be performed on said virtual disk image file during said running of said active VM is directed to a first incremental disk file, and wherein said changes to be made to said virtual disk image file during said running of said active VM are stored in said first incremental disk file.

4. The method according to claim 3, wherein a write operation to be performed on said virtual disk image file during said upgrading is directed to a second incremental disk file, and wherein said changes to be made to said virtual disk image file during said upgrading are stored in said second incremental disk file.

5. The method according to claim 4, wherein, before said merging step, said active VM and said active process of said Java application program therein are paused, and said virtual disk image file is set to be writable.

6. The method according to claim 5, wherein said virtual disk image file is changed based on said second incremental disk file if a conflict exists between said first incremental disk file and said second incremental disk file.

7. A method for upgrading a guest Operation System (OS) of an active Virtual Machine (VM), comprising:
   replicating said active VM to generate a backup VM, said backup VM using a virtual disk image file of said active VM, wherein said virtual disk image file is set to be read-only;
   upgrading a guest OS of said backup VM into said virtual disk image file;
   merging changes to be made to said virtual disk image file during running of said active VM and changes to be made to said virtual disk image file during said upgrading;
   pausing said backup VM;
   migrating an active process of a Java application program running in said active VM into said backup VM to generate a backup process;
   migrating resources occupied by said active process of said Java application program into said backup VM such that said backup process occupies same resources;
   resuming running of said backup VM; and
   wherein said migrating said active process comprises:
   acquiring a virtual memory address used by said active process in said active VM;
   converting said acquired virtual memory address to a physical memory address in a physical machine according to a mapping relationship between virtual memory addresses managed by said active VM and physical memory addresses in said physical machine;
   transferring control of said physical memory address from said active VM to said backup VM; and
   creating said backup process of said Java application program in said upgraded guest OS, and directing a memory space for said backup process to said physical memory address.

8. A method for upgrading a guest Operation System (OS) of an active Virtual Machine (VM), comprising:
   replicating said active VM to generate a backup VM, said backup VM using a virtual disk image file of said active VM, wherein said virtual disk image file is set to be read-only;
   upgrading a guest OS of said backup VM into said virtual disk image file;
   merging changes to be made to said virtual disk image file during running of said active VM and changes to be made to said virtual disk image file during said upgrading;
   pausing said backup VM;
   migrating an active process of a Java application program running in said active VM into said backup VM to generate a backup process;
   migrating resources occupied by said active process of said Java application program into said backup VM such that said backup process occupies same resources;
   resuming running of said backup VM;
   wherein said virtual disk image file is set to be read-only before said active VM is replicated, and wherein said backup VM has the same setting as said active VM;
   wherein a write operation to be performed on said virtual disk image file during said running of said active VM is directed to a first incremental disk file, and wherein said changes to be made to said virtual disk image file during said running of said active VM are stored in said first incremental disk file;
   wherein a write operation to be performed on said virtual disk image file during said upgrading is directed to a second incremental disk file, and wherein said changes to be made to said virtual disk image file during said upgrading are stored in said second incremental disk file;
   wherein, before said merging, said active VM and said active process of said Java application program therein are paused, and said virtual disk image file is set to be writable;
   wherein said virtual disk image file is changed based on said second incremental disk file if a conflict exists between said first incremental disk file and said second incremental disk file; and
   wherein said migrating said active process comprises:
   acquiring a virtual memory address used by said active process in said active VM;

converting said acquired virtual memory address to a physical memory address in a physical machine according to a mapping relationship between virtual memory addresses managed by said active VM and physical memory addresses in said physical machine;

transferring control of said physical memory address from said active VM to said backup VM; and creating said backup process of said Java application program in said upgraded guest OS, and directing a memory space for said backup process to said physical memory address.

9. The method according to claim 1, wherein said of migrating said resources comprises:

finding all resources occupied by said active process in a corresponding Java VM, said guest OS of said active VM, said active VM, and a physical machine; and migrating all said resources into said backup VM in an order from a lower layer to an upper layer.

10. The method according to claim 7, wherein said migrating said resources comprises:

finding all resources occupied by said active process in a corresponding Java VM, said guest OS of said active VM, said active VM, and a physical machine; and migrating all said resources into said backup VM in an order from a lower layer to an upper layer.

11. A device for upgrading a guest OS (Operating System) of an active VM (Virtual Machine), including:

a replicating unit for replicating said active VM to generate a backup VM, said backup VM using a virtual disk image file of said active VM, wherein said virtual disk image file is set to be read-only;

an upgrading unit for upgrading a guest OS of said backup VM;

a merging unit for merging changes to be made to said virtual disk image file during running of said active VM and changes to be made to said virtual disk image file during said upgrade into said virtual disk image file;

a migrating unit for migrating an active process of a Java application program running in said active VM into said backup VM to generate a backup process, and migrating resources occupied by said active process of said Java application program into said backup VM such that said backup process occupies same resources; and a control unit for pausing said backup VM before said migrating unit migrates said active process and said resources, and resuming running of said backup VM after said migrating unit migrates said active process and said resources.

12. The device according to claim 11, wherein said control unit sets said virtual disk image file to be read-only before said replicating unit replicates said active VM, and wherein said backup VM has the same setting as said active VM.

13. The device according to claim 12, wherein said control unit directs a write operation to be performed on said virtual disk image file during said running of said active VM to a first incremental disk file, such that said changes to be made to said virtual disk image file during said running of said active VM are stored in said first incremental disk file.

14. The device according to claim 13, wherein said control unit directs a write operation to be performed on said virtual disk image file during said upgrade to a second incremental disk file, wherein said changes to be made to said virtual disk image file during said upgrade are stored in said second incremental disk file.

15. The device according to claim 14, wherein, before said merging unit performs said merging, said control unit pauses said active VM and said active process of said Java application program therein, and sets said virtual disk image file to be writable.

16. The device according to claim 15, wherein said merging unit changes said virtual disk image file based on said second incremental disk file if a conflict exists between said first incremental disk file and said second incremental disk file.

17. A device for upgrading a guest OS (Operating System) of an active VM (Virtual Machine), including:

a replicating unit for replicating said active VM to generate a backup VM, said backup VM using a virtual disk image file of said active VM, wherein said virtual disk image file is set to be read-only;

an upgrading unit for upgrading a guest OS of said backup VM;

a merging unit for merging changes to be made to said virtual disk image file during running of said active VM and changes to be made to said virtual disk image file during said upgrade into said virtual disk image file;

a migrating unit for migrating an active process of a Java application program running in said active VM into said backup VM to generate a backup process, and migrating resources occupied by said active process of said Java application program into said backup VM such that said backup process occupies same resources;

a control unit for pausing said backup VM before said migrating unit migrates said active process and said resources, and resuming running of said backup VM after said migrating unit migrates said active process and said resources; and wherein said migrating unit migrates said active process by (i) acquiring a virtual memory address used by said active process in said active VM, (ii) converting said acquired virtual memory address to a physical memory address in a physical machine according to a mapping relationship between virtual memory addresses managed by said active VM and physical memory addresses in said physical machine, (iii) transferring control of said physical memory address from said active VM to said backup VM, and (iv) creating said backup process of said Java application program in said upgraded guest OS and directing a memory space for said backup process to said physical memory address.

18. A device for upgrading a guest OS (Operating System) of an active VM (Virtual Machine), including:

a replicating unit for replicating said active VM to generate a backup VM, said backup VM using a virtual disk image file of said active VM, wherein said virtual disk image file is set to be read-only;

an upgrading unit for upgrading a guest OS of said backup VM;

a merging unit for merging changes to be made to said virtual disk image file during running of said active VM and changes to be made to said virtual disk image file during said upgrade into said virtual disk image file;

a migrating unit for migrating an active process of a Java application program running in said active VM into said backup VM to generate a backup process, and migrating resources occupied by said active process of said Java application program into said backup VM such that said backup process occupies same resources;

a control unit for pausing said backup VM before said migrating unit migrates said active process and said resources, and resuming running of said backup VM after said migrating unit migrates said active process and said resources;

wherein said control unit sets said virtual disk image file to be read-only before said replicating unit replicates said active VM, and wherein said backup VM has the same setting as said active VM;

wherein said control unit directs a write operation to be performed on said virtual disk image file during said running of said active VM to a first incremental disk file, such that said changes to be made to said virtual disk image file during said running of said active VM are stored in said first incremental disk file;

wherein said control unit directs a write operation to be performed on said virtual disk image file during said upgrade to a second incremental disk file, wherein said changes to be made to said virtual disk image file during said upgrade are stored in said second incremental disk file;

wherein, before said merging unit performs said merging, said control unit pauses said active VM and said active process of said Java application program therein, and sets said virtual disk image file to be writable;

wherein said merging unit changes said virtual disk image file based on said second incremental disk file if a conflict exists between said first incremental disk file and said second incremental disk file; and wherein said migrating unit migrates said active process by (i) acquiring a virtual memory address used by said active process in said active VM, (ii) converting said acquired virtual memory address to a physical memory address in a physical machine according to a mapping relationship between virtual memory addresses managed by said active VM and physical memory addresses in said physical machine, (iii) transferring control of said physical memory address from said active VM to said backup VM, and (iv) creating said backup process of said Java application program in said upgraded guest OS and directing a memory space for said backup process to said physical memory address.

19. The device according to claim 11, wherein said migrating unit migrates said resources by (i) finding all resources occupied by said active process in a corresponding Java VM, said guest OS of said active VM, said active VM, and a physical machine, and (ii) migrating all said resources occupied by said active process in said corresponding Java VM into said backup VM in an order from a lower layer to an upper layer.

20. The device according to claim 17, wherein said migrating unit migrates said resources by (i) finding all resources occupied by said active process in a corresponding Java VM, said guest OS of said active VM, said active VM, and a physical machine, and (ii) migrating all said resources occupied by said active process in said corresponding Java VM into said backup VM in an order from a lower layer to an upper layer.

* * * * *